(12) United States Patent
Luan et al.

(10) Patent No.: US 12,540,852 B2
(45) Date of Patent: Feb. 3, 2026

(54) MODULAR-RECONFIGURABLE LONG-TERM IN-SITU MONITORING DEVICE AND MONITORING METHOD

(71) Applicant: Institute of Oceanology, Chinese Academy of Sciences, Qingdao (CN)

(72) Inventors: Zhendong Luan, Qingdao (CN); Xin Zhang, Qingdao (CN); Zengfeng Du, Qingdao (CN); Jianxing Zhang, Qingdao (CN); Shichuan Xi, Qingdao (CN); Lianfu Li, Qingdao (CN); Xiong Zhang, Qingdao (CN); Chao Lian, Qingdao (CN); Jun Yan, Qingdao (CN)

(73) Assignee: Institute of Oceanology, Chinese Academy of Sciences, Qingdao (CN)

( * ) Notice: Subject to any disclaimer, the term of this patent is extended or adjusted under 35 U.S.C. 154(b) by 457 days.

(21) Appl. No.: 18/139,376

(22) Filed: Apr. 26, 2023

(65) Prior Publication Data
US 2023/0408336 A1 Dec. 21, 2023

(30) Foreign Application Priority Data
Jun. 15, 2022 (CN) .......................... 202210671909.4

(51) Int. Cl.
*G01J 3/44* (2006.01)
*G01J 3/02* (2006.01)
*G01N 21/65* (2006.01)

(52) U.S. Cl.
CPC ........... *G01J 3/4412* (2013.01); *G01J 3/0202* (2013.01); *G01N 21/65* (2013.01)

(58) Field of Classification Search
CPC .......... G01J 3/4412; G01J 3/0202; G01J 3/44; G01N 21/65; G01N 2201/0218; G01N 2201/024; Y02A 90/30; G01V 9/007; G01D 21/02
See application file for complete search history.

(56) References Cited

U.S. PATENT DOCUMENTS

2017/0286572 A1* 10/2017 Hershey .................... B64F 5/60

FOREIGN PATENT DOCUMENTS

| CN | 104508422 A | * | 4/2015 | ............. B63B 79/10 |
| CN | 208607151 U | * | 3/2019 | |

* cited by examiner

*Primary Examiner* — Abdullahi Nur
(74) *Attorney, Agent, or Firm* — HEA Law PLLC; Darrin A. Auito

(57) ABSTRACT

Disclosed is a modularized-reconfigurable long-term in-situ monitoring device and a monitoring method. The monitoring device comprises a fixed component. The fixed component is provided with a physical and chemical parameter sensor interface, a multi-channel Raman detection system, a camera system, an ocean current recording system, a control system, a power supply system, a lighting system, a floating body and an optical communication system. A releaser is arranged in the middle of the top of the fixed component. The releasing end of the releaser is connected with one end of a connecting rod penetrating through the fixed component, and the other end of the connecting rod is connected with a bottom counterbalance weight through a manual releaser. The working efficiency is improved, the operation risk is reduced, and the positioning precision is high.

20 Claims, 5 Drawing Sheets

MODULAR-RECONFIGURABLE LONG-TERM IN-SITU MONITORING DEVICE AND MONITORING METHOD

CROSS REFERENCE TO RELATED APPLICATION

This patent application claims the benefit and priority of Chinese Patent Application No. 202210671909.4, filed with the China National Intellectual Property Administration on Jun. 15, 2022, the disclosure of which is incorporated by reference herein in its entirety as part of the present application.

TECHNICAL FIELD

The present disclosure relates to the technical field of deep-sea in-situ monitoring, in particular to a modular-reconfigurable long-term in-situ monitoring device and a monitoring method.

BACKGROUND

The rapid development of underwater vehicle technology, such as remote operated vehicle (ROV) and human occupied vehicle (HOV), provides more intuitive and efficient sampling and in-situ detection means for ocean research, especially deep sea research. Many domestic underwater vehicles, such as Discovery, Starfish 6000, Hailong III and other ROVs, and Jiaolong, Deep Sea Warrior, Struggle and other HOVs, have been gradually put into use, thereby obtaining a large number of valuable in-situ data and samples, and speeding up the cognitive process of deep sea.

Up to now, the results obtained by sampling or in-situ detection using underwater vehicles as the platform are often random and isolated. And in the evolution process of deep-sea hydrothermal and cold seep systems, the solution of major scientific problems such as community changes in deep-sea dark biosphere needs a large number of in-situ, long-term and continuous observation data. The method of using underwater vehicles as submersibles for detection can no longer meet the detection needs of oceanographers today, and it is urgent to develop a platform capable of in-situ, long-term and continuous observation.

The submarine observation network can be equipped with various types of observation nodes, and needs shore-based real-time power supply and communication. Many submarine observation networks have been built in the world. However, due to the limitations of long construction period and fixed observation area of submarine observation network, it is impossible to flexibly observe deep-sea cold seeps, hydrothermal fluids and other geological phenomena continuously.

SUMMARY

In order to overcome the above problems existing in the prior art, the present disclosure provides a modular-reconfigurable long-term in-situ monitoring device and a monitoring method.

In order to solve the technical problems, the present disclosure adopts the following technical scheme. The modularized-reconfigurable long-term in-situ monitoring device includes a fixed component. The fixed component is provided with a physical and chemical parameter sensor interface, a multi-channel Raman detection system, a camera system, an ocean current recording system, a control system, a power supply system, a lighting system, a floating body and an optical communication system. A releaser is arranged in the middle of the top of the fixed component. The releasing end of the releaser is connected with one end of a connecting rod penetrating through the fixed component, and the other end of the connecting rod is connected with a bottom counterbalance weight through a manual releaser.

According to the modularized-reconfigurable long-term in-situ monitoring device, the fixed component includes a main body frame and an expansion frame. The main body frame is divided into three layers. The floating body is arranged on the first layer of the main body frame. The physical and chemical parameter sensor interface, the camera system, the ocean current recording system and the lighting system are all installed on the first layer of the main body frame. The control system is installed on the second layer of the main body frame. The optical communication system is installed on the top of the second layer of the main body frame. The multi-channel Raman detection system and the power supply system are installed on the third layer of the main body frame. The expansion frame is arranged on the side surface of the third layer of the main body frame for installing a Raman probe.

According to the modularized-reconfigurable long-term in-situ monitoring device, a coupling hook for connecting with the scientific research ship is arranged at the middle position of the top of the fixed component.

According to the modularized-reconfigurable long-term in-situ monitoring device, the coupling hook is connected with one end of an external releaser. The other end of the external releaser is connected with one end of an optical cable load-bearing head through a photoelectric conversion mechanism. The other end of the optical cable load-bearing head is connected with a photoelectric composite optical cable or a coaxial cable of the scientific research ship.

According to the modularized-reconfigurable long-term in-situ monitoring device, the manual releaser includes a pull pin, a spring and a connecting plate. A release plate is arranged at the end, close to the manual releaser, of the connecting rod. A through hole for the pull pin to pass through is formed in the connecting plate. The release plate and the connecting plate are fixed by the pull pin. The spring sleeves the pull pin.

According to the modularized-reconfigurable long-term in-situ monitoring device, the side surface of the bottom counterbalance weight is provided with a lifting ring pin shaft.

According to the modularized-reconfigurable long-term in-situ monitoring device, the ocean current recording system includes an ocean current meter and an acoustic doppler current profiler (ADCP). The ocean current meter is located on the side edge of the first layer of the main body frame. The ADCP is installed on the side surface of the first layer of the main body frame through a mounting frame. The optical communication system includes a lander carried light flux end and a hand-held light flux end. The lander carried light flux end is located on the top of the second layer of the main body frame.

A monitoring method of the modularized-reconfigurable long-term in-situ monitoring device includes the following steps:

step one, using geophysical equipment carried by the scientific research ship, combining with the existing geological data, investigating and analyzing the topography and stratum structure of the area to be measured, preliminarily judging the seabed sediment type, sediment distribution characteristics and thickness, analyzing the operation risk, and finally observing in detail through the hand-held light flux end, and targeting the launching operation station of the equipment;

step two, detecting a lander monitoring device on the deck of the scientific research ship, connecting with the ship-borne coaxial cable or photoelectric composite optical cable, and testing the power supply and communication performances;

step three, lifting the monitoring device by a winch and lowering the monitoring device into seawater, after the equipment is stable, lowering the equipment to the seabed at a uniform speed, during the lowering process, analyzing the physical state and communication state of the monitoring device in real time by using the optical communication system to judge the operating conditions;

step four, after the designated monitoring position is reached, releasing the equipment by the external releaser, enabling the monitoring device to sit at the bottom, setting the acquisition parameters of the detection device by using the control system, setting the observation area of the camera system, and setting the sampling interval of the sensor and the camera system and the starting interval of the operating time; and step five, after the monitoring operation is completed, releasing the counterbalance weight by the releaser, floating up the monitoring device by oneself for recovery, and after the data is recovered to the scientific research ship, exporting and converting the data to complete the in-situ monitoring operation of hydrothermal and cold seep areas.

According to the monitoring method of the modularized-reconfigurable long-term in-situ monitoring device, the control system has an on-line mode and an off-line mode. When the control system is connected with the coaxial cable or photoelectric composite optical cable of the scientific research ship, the control system is in the on-line mode. At this time, the operating time and interval of each unit of the monitoring device can be set. When the control system is disconnected from the coaxial cable or photoelectric composite optical cable of the scientific research ship, the control system is in the off-line mode. At this time, the monitoring device starts to operate off-line according to the operating parameters set in the on-line mode.

In the off-line mode, the control system can access the monitoring device within the operating window period set in the on-line mode and has the same setting function as the on-line mode. After the control system ends the access, the monitoring device enters the off-line mode.

The present disclosure has the following beneficial effects. Firstly, the modularized long-term in-situ monitoring system of the separable and expandable lander in the present disclosure, the in-situ ocean current velocity and flow direction distribution are investigated by using the ocean current meter. Fixed-point long-term observation is carried out on key water areas. A three-dimensional, spatio-temporal high-resolution hydrodynamic model can be further established. An accurate physical background field is provided as a basis for ecological environment simulation. The concentration distribution characteristics of CH4, H2S and other biogenic elements near cold seep vents are researched at multiple points by using the multi-channel Raman detection system, and in-situ data support is provided for the carbon-sulfur conversion channel in the cold seep area. The image information of plankton, swimming animals, benthos, red tide algae and fouling organisms is obtained by using the camera system, and the biodiversity is researched by morphological identification and metagenome methods. For protozoa, the species composition is researched by morphological identification and single cell genome methods.

Secondly, the on-line real-time monitoring function of the present disclosure can reflect the safety state of the equipment and the environmental condition of the hydrothermal and cold seep areas, so that the operating efficiency can be greatly improved, and the operation risk is reduced. The device is compact in structure, high in pressure resistance, simple in operation and high in positioning accuracy, and the geological, hydrological, chemical and biological information in the hydrothermal and cold seep areas can be quickly and effectively obtained to complete in-situ monitoring tasks.

Thirdly, the monitoring device of the present disclosure can be recovered, so that the marine environment is effectively protected. By arranging the double releasing devices such as the manual releaser and the releaser, the problems that the bottom counterbalance weight can not be released because the releaser can not operate normally and that the monitoring device can not be recovered are avoided.

BRIEF DESCRIPTION OF THE DRAWINGS

The description of the present disclosure is further described in conjunction with the attached figures and embodiments.

REFERENCE SIGNS 1, main body frame; 2, ADCP; 3, releaser; 4, camera system; 5, ocean current meter; 6, floating body; 7, lighting system; 8, multi-channel Raman detection system; 9, external releaser; 10, bottom counterbalance weight; 11, expansion frame; 12, power supply system; 13. Raman probe; 14, control system; 15, lander carried light flux end; 16, physical and chemical parameter sensor interface; 17, connecting rod; 18, pull pin; 19, spring seat; 20, lifting ring pin shaft; 21, release plate; 22, connecting plate; 23, photoelectric conversion mechanism; 24, optical cable load-bearing head; and 25, floating ball.

DETAILED DESCRIPTION OF THE EMBODIMENTS

For the purpose that those skilled in the art understand the technical solution of the present disclosure better, the following illustrates the present disclosure with the reference to the attached figures and specific embodiments.

Figure 1:
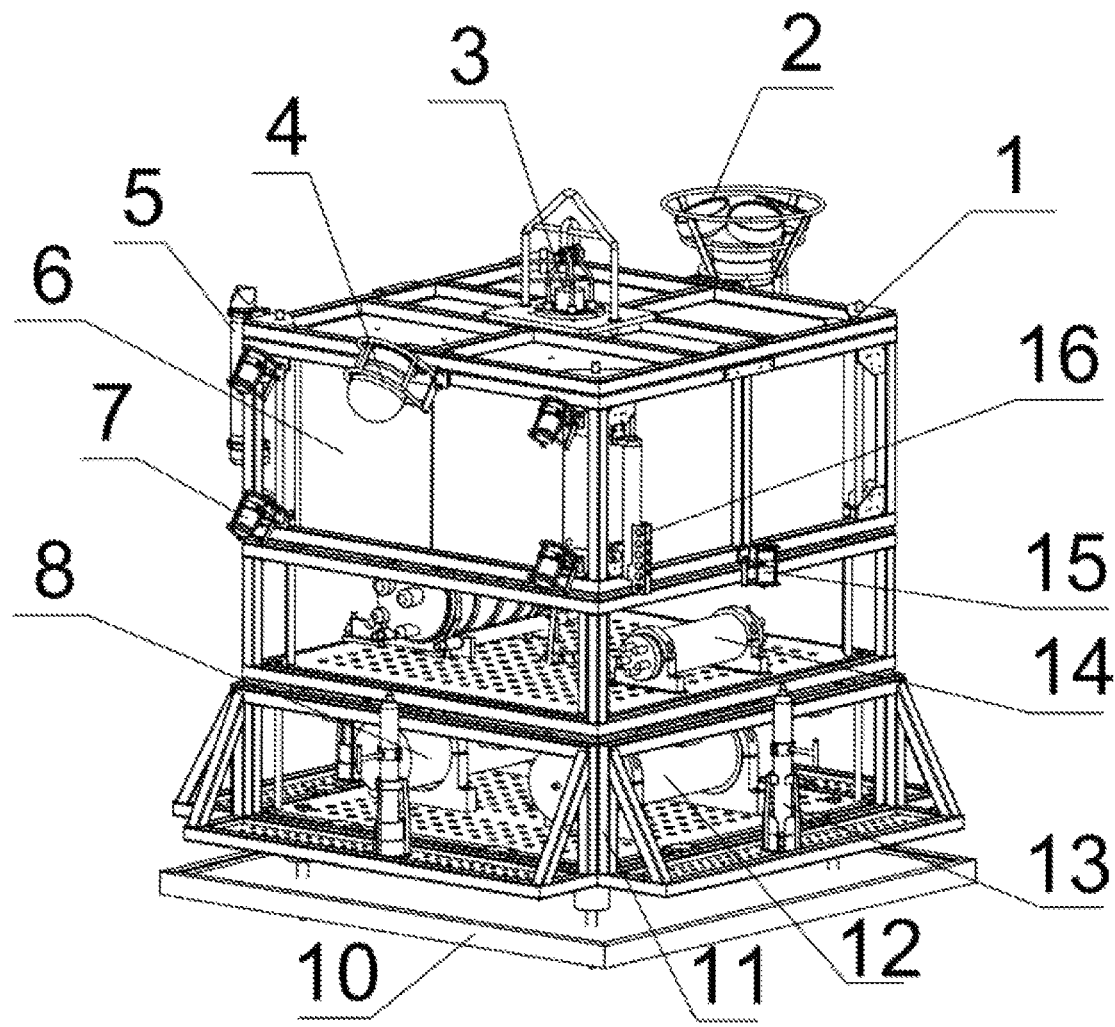
FIG. 1 is a schematic diagram of the present disclosure.
Figure 2:
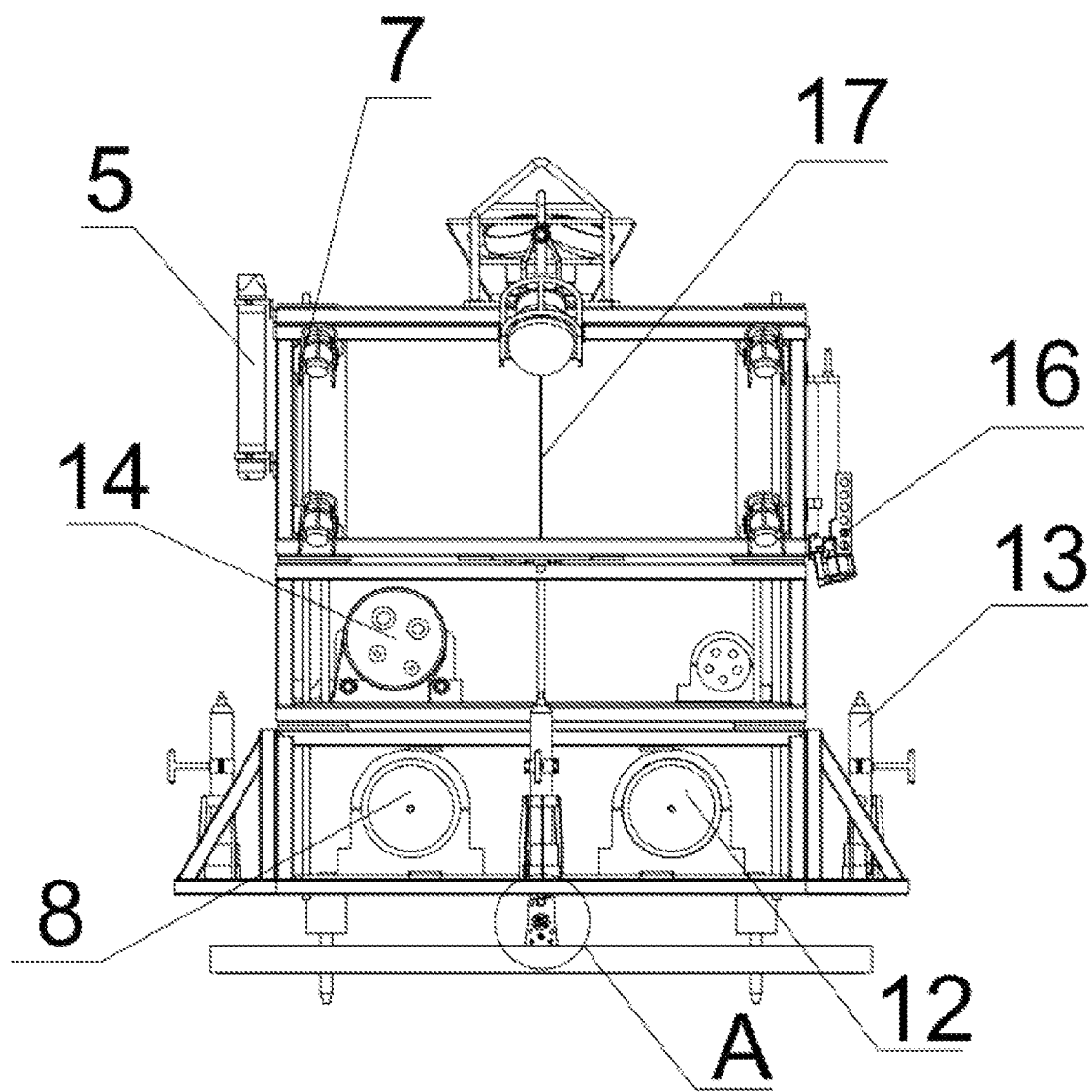
FIG. 2 is a front view of the present disclosure.
Figure 3:
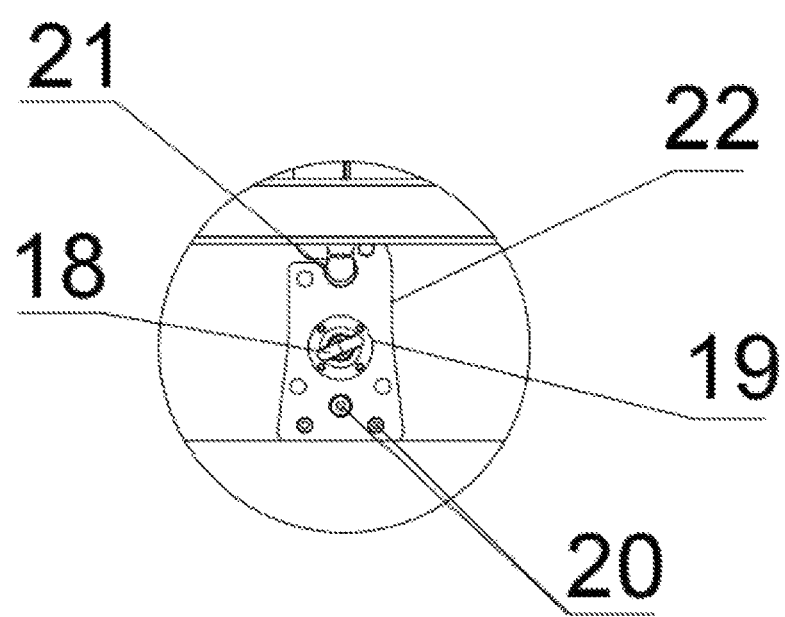
FIG. 3 is an enlarged view of part A in FIG. 2 of the present disclosure.

As shown in FIG. 1 to FIG. 3, the embodiment discloses a modularized-reconfigurable long-term in-situ monitoring device. The monitoring device includes a fixed component, a physical and chemical parameter sensor interface, a multi-channel Raman detection system, a camera system, an ocean current recording system, a control system, a power supply system, a lighting system, a floating body and an optical communication system. The fixed component is used for fixing and assembling the system and connecting with a ship-borne coaxial cable. The physical and chemical parameter sensor interface is used for inserting and installing various physical and chemical parameter sensors, and the physical and chemical parameter sensors are used for real-time acquisition of temperature, salinity, depth, dissolved oxygen and methane concentration in hydrothermal and cold seep areas. The multi-channel Raman detection system is used for synchronously obtaining the fingerprint characteristics of the Raman spectrum of submarine hydrothermal solution and cold seep vent fluid at multiple points in real time. The camera system is used for simultaneously recording fluid eruption and biological community change characteristics in submarine hydrothermal and cold seep areas. The ocean current recording system is used for acquiring single-point and profile velocity changes near underflow in hydrothermal and cold seep vents in real time. The control system is used for setting and storing operating parameters of various carrying items of the lander. The power supply system is used for supplying power to the whole lander system. The optical communication system is used for controlling and correcting the system during operation and collecting and transmitting real-time data.

The fixed component includes a main body frame 1 and an expansion frame 11. The main body frame 1 is divided into three layers. The floating body 6 is arranged on the first layer of the main body frame 1. The physical and chemical parameter sensor interface 16, the camera system 4, the ocean current recording system and the lighting system 7 are all installed on the first layer of the main body frame 1. The control system 14 is installed on the second layer of the main body frame 1. The optical communication system is installed on the top of the second layer of the main body frame 1. The multi-channel Raman detection system 8 and the power supply system 12 are installed on the third layer of the main body frame. The expansion frame 11 is arranged on the side surface of the third layer of the main body frame 1 for installing a Raman probe 13. A releaser 3 is arranged in the middle of the top of the main body frame 1. A coupling hook for connecting with the scientific research ship is arranged on the main body frame 1 corresponding to the upper part of the releaser 3. The releasing end of the releaser 3 is connected with one end of a connecting rod 17 penetrating through the main body frame 1, and the other end of the connecting rod 17 is connected with a bottom counterbalance weight 10 through a manual releaser.

In this embodiment, the manual releaser includes a pull pin 18, a spring and a connecting plate 22. A release plate 21 is arranged at the end, close to the manual releaser, of the connecting rod 17. A through hole for the pull pin 18 to pass through is formed in the connecting plate 22. The release plate 21 and the connecting plate 22 are fixed by the pull pin 18. The spring sleeves the pull pin 18. A spring seat 19 is arranged on the connecting plate 22 corresponding to the spring. When the pull pin 18 is inserted into the through hole, the spring on the pull pin 18 is in a compressed state to press and fix the connecting plate 22 and the release plate.

Figure 4:
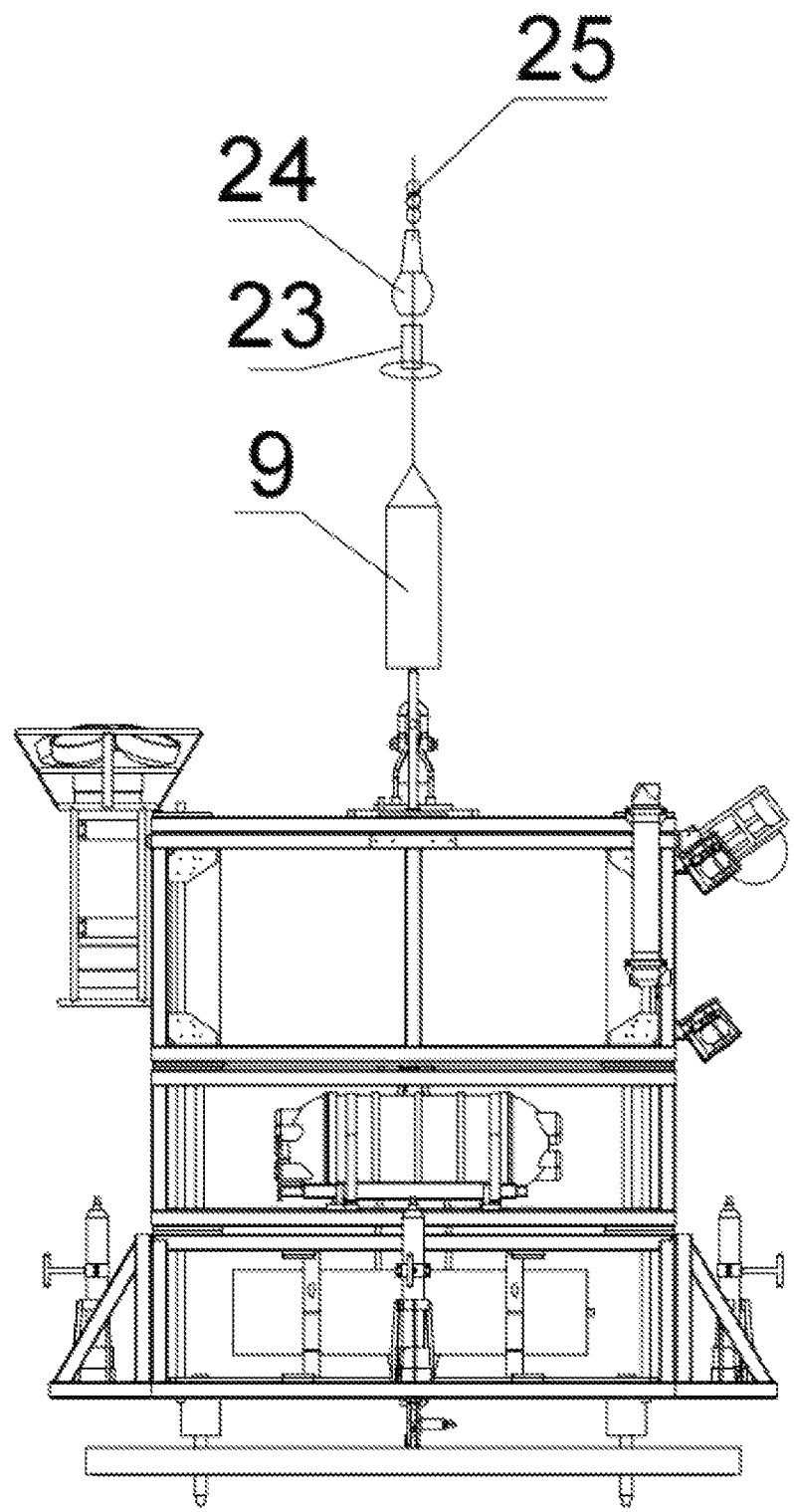
FIG. 4 is a schematic diagram of the connection between a monitoring device and a coaxial cable or photoelectric composite optical cable in the present disclosure.
Figure 5:
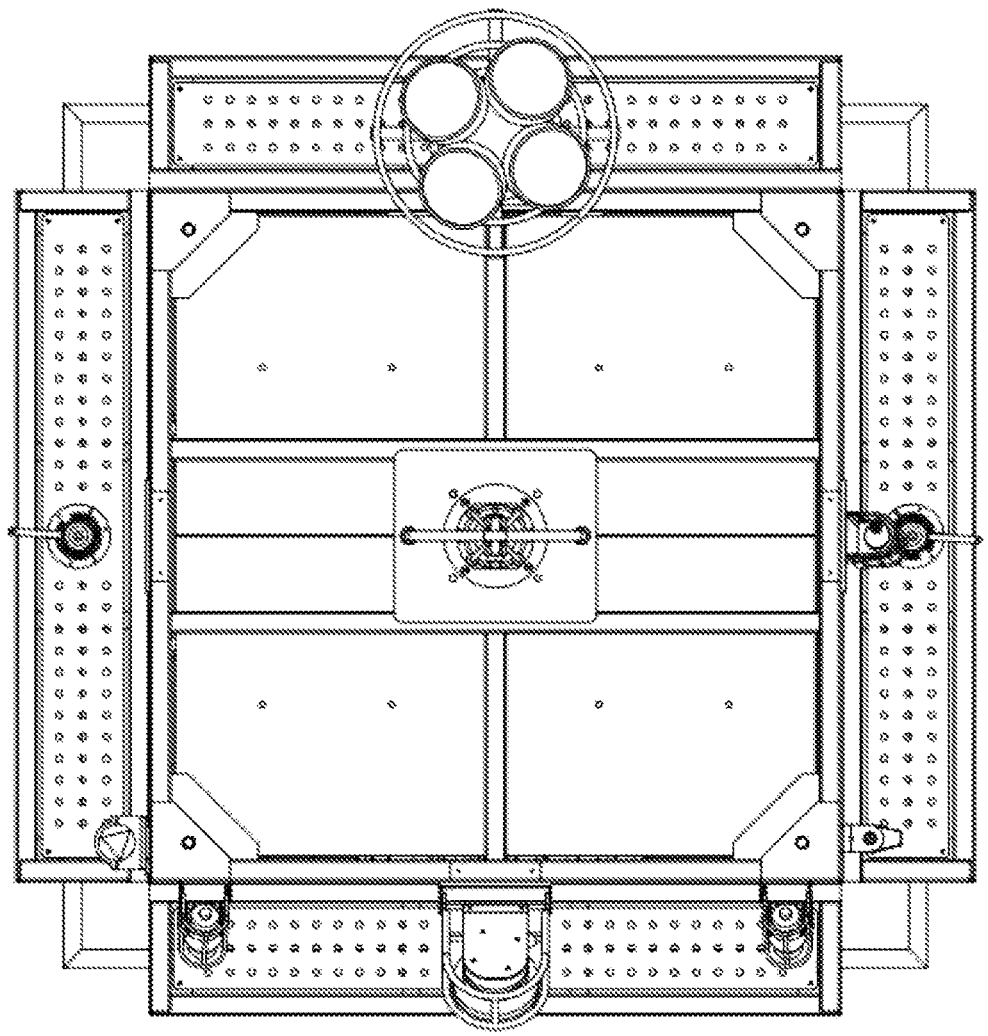
FIG. 5 is a top view of the present disclosure.

In the embodiment, the specific structure, connected with the scientific research ship, of the monitoring device is shown in FIG. 4. The coupling hook is connected with one end of an external releaser 9. The other end of external releaser 9 is connected with one end of an optical cable load-bearing head 24 through a photoelectric conversion mechanism 23. The other end of the optical cable load-bearing head 24 is connected with a floating ball 25. The upper part of the floating ball is connected with a photo-electric composite optical cable or a coaxial cable of the scientific research ship through a steel cable.

In the embodiment, in order to facilitate the lifting of the monitoring device, the side surface of the bottom counterbalance weight 10 is provided with a lifting ring pin shaft 20.

In the embodiment, the ocean current recording system includes an ocean current meter 5 and an ADCP 2. The ocean current meter 5 is located on the side edge of the first layer of the main body frame 1. The ADCP 2 is installed on the side surface of the first layer of the main body frame through a mounting frame. The optical communication system includes a lander carried light flux end 15 and a hand-held light flux end. The lander carried light flux end 15 is located on the top of the second layer of the main body frame.

A monitoring method of the modularized-reconfigurable long-term in-situ monitoring device includes the following steps:

step one, using geophysical equipment carried by the scientific research ship, combining with the existing geological data, investigating and analyzing the topography and stratum structure of the area to be measured, preliminarily judging the seabed sediment type, sediment distribution characteristics and thickness, analyzing the operation risk, and finally observing in detail through the hand-held light flux end, and targeting the launching operation station of the equipment;

step two, detecting a lander monitoring device on the deck of the scientific research ship, connecting with the ship-borne coaxial cable or photoelectric composite optical cable, and testing the power supply and communication performances;

step three, lifting the monitoring device by a winch and lowering the monitoring device into seawater, after the equipment is stable, lowering the equipment to the seabed at a uniform speed, during the lowering process, analyzing the physical state and communication state of the monitoring device in real time by using the optical communication system to judge the operating conditions;

step four, after the designated monitoring position is reached, releasing the equipment by the external releaser, enabling the monitoring device to sit at the bottom, setting the acquisition parameters of the detection device by using the control system, setting the observation area of the camera system, and setting the sampling interval of the sensor and the camera system and the starting interval of the operating time; and step five, after the monitoring operation is completed, releasing the counterbalance weight by the releaser, floating up the monitoring device by oneself for recovery, and after the data is recovered to the scientific research ship, exporting and converting the data to complete the in-situ monitoring operation of hydrothermal and cold seep areas.

In step five, the releaser 3 is an acoustic releaser. When the monitoring device needs to be recovered, the connecting rod can be released by the releaser 3. The connecting rod is connected with the bottom counterbalance weight, namely the bottom counterbalance weight can be released. When the releaser 3 cannot operate normally, the connecting rod cannot be released. At this time, the pull pin can be pulled by the underwater manipulator or underwater robot. After the pull pin is pulled out, the original length of the spring is recovered, and the pressing force on the release plate and the connecting plate is lost. The release plate is separated from the connecting plate. The connecting plate is connected with the bottom counterbalance weight. The release of the bottom counterbalance weight can be realized.

According to the monitoring method of the modularized-reconfigurable long-term in-situ monitoring device, the control system has an on-line mode and an off-line mode. When the control system is connected with the coaxial cable or photoelectric composite optical cable of the scientific research ship, the control system is in the on-line mode. At this time, the operating time and interval of each unit of the monitoring device can be set. When the control system is disconnected from the coaxial cable or photoelectric composite optical cable of the scientific research ship, the control system is in the off-line mode. At this time, the monitoring device starts to operate off-line according to the operating parameters set in the on-line mode.

In the off-line mode, the control system can access the monitoring device within the operating window period set in the on-line mode and has the same setting function as the on-line mode. After the control system ends the access, the monitoring device enters the off-line mode.

The above embodiments are only exemplary embodiments of the present disclosure, and are not intended to limit the present disclosure. The scope of protection of the present disclosure is defined by the claims. Those skilled in the art can make various modifications or equivalent substitutions to the present disclosure within the scope of essence and protection, and these modifications or equivalent substitutions should also be regarded as falling invention the scope of protection of the present disclosure.

What is claimed is:

1. A modularized-reconfigurable long-term in-situ monitoring device, comprising a fixed component, wherein the fixed component is provided with a physical and chemical parameter sensor interface, a multi-channel Raman detection system, a camera system, an ocean current recording system, a control system, a power supply system, a lighting system, a floating body and an optical communication system, a releaser is arranged in the middle of the top of the fixed component, the releasing end of the releaser is connected with one end of a connecting rod penetrating through the fixed component, and the other end of the connecting rod is connected with a bottom counterbalance weight through a manual releaser.

2. The modularized-reconfigurable long-term in-situ monitoring device according to claim 1, wherein the fixed component comprises a main body frame and an expansion frame, the main body frame is divided into three layers, the floating body is arranged on the first layer of the main body frame, the physical and chemical parameter sensor interface, the camera system, the ocean current recording system and the lighting system are all installed on the first layer of the main body frame, the control system is installed on the second layer of the main body frame, the optical communication system is installed on the top of the second layer of the main body frame, the multi-channel Raman detection system and the power supply system are installed on the third layer of the main body frame, and the expansion frame is arranged on the side surface of the third layer of the main body frame for installing a Raman probe.

3. The modularized-reconfigurable long-term in-situ monitoring device according to claim 1, wherein a coupling hook for connecting with the scientific research ship is arranged at the middle position of the top of the fixed component.

4. The modularized-reconfigurable long-term in-situ monitoring device according to claim 3, wherein the coupling hook is connected with one end of an external releaser, the other end of the external releaser is connected with one end of an optical cable load-bearing head through a photoelectric conversion mechanism, and the other end of the optical cable load-bearing head is connected with a photoelectric composite optical cable or a coaxial cable of the scientific research ship.

5. The modularized-reconfigurable long-term in-situ monitoring device according to claim 1, wherein the manual releaser comprises a pull pin, a spring and a connecting plate, a release plate is arranged at the end, close to the manual releaser, of the connecting rod, a through hole for the pull pin to pass through is formed in the connecting plate, the release plate and the connecting plate are fixed by the pull pin, and the spring sleeves the pull pin.

6. The modularized-reconfigurable long-term in-situ monitoring device according to claim 1, wherein the side surface of the bottom counterbalance weight is provided with a lifting ring pin shaft.

7. The modularized-reconfigurable long-term in-situ monitoring device according to claim 2, wherein the ocean current recording system comprises an ocean current meter and an ADCP, the ocean current meter is located on the side edge of the first layer of the main body frame, the ADCP is installed on the side surface of the first layer of the main body frame through a mounting frame, and the optical communication system comprises a lander carried light flux end and a hand-held light flux end, and the lander carried light flux end is located on the top of the second layer of the main body frame.

8. A monitoring method by using the modularized-reconfigurable long-term in-situ monitoring device according to claim 1, comprising the following steps:

step one, using geophysical equipment carried by the scientific research ship, combining with the existing geological data, investigating and analyzing the topography and stratum structure of the area to be measured, preliminarily judging the seabed sediment type, sediment distribution characteristics and thickness, analyzing the operation risk, and finally observing in detail through the hand-held light flux end, and targeting the launching operation station of the equipment;

step two, detecting a lander monitoring device on the deck of the scientific research ship, connecting with the ship-borne coaxial cable or photoelectric composite optical cable, and testing the power supply and communication performances;

step three, lifting the monitoring device by a winch and lowering the monitoring device into seawater, after the equipment is stable, lowering the equipment to the seabed at a uniform speed, during the lowering process, analyzing the physical state and communication state of the monitoring device in real time by using the optical communication system to judge the operating conditions;

step four, after the designated monitoring position is reached, releasing the equipment by the external releaser, enabling the monitoring device to sit at the bottom, setting the acquisition parameters of the detection device by using the control system, setting the observation area of the camera system, and setting the sampling interval of the sensor and the camera system and the starting interval of the operating time; and step five, after the monitoring operation is completed, releasing the counterbalance weight by the releaser, floating up the monitoring device by oneself for recovery, and after the data is recovered to the scientific research ship, exporting and converting the data to complete the in-situ monitoring operation of hydrothermal and cold seep areas.

9. The monitoring method according to claim 8, wherein the control system has an on-line mode and an off-line mode, when the control system is connected with the coaxial cable or photoelectric composite optical cable of the scientific research ship, the control system is in the on-line mode, at this time, the operating time and interval of each unit of the monitoring device can be set, and when the control system is disconnected from the coaxial cable or photoelectric composite optical cable of the scientific research ship, the control system is in the off-line mode, at this time, the monitoring device starts to operate off-line according to the operating parameters set in the on-line mode; and in the off-line mode, the control system can access the monitoring device within the operating window period set in the on-line mode and has the same setting function as the on-line mode, after the control system ends the access, the monitoring device enters the off-line mode.

10. The monitoring method according to claim 8, wherein the fixed component comprises a main body frame and an expansion frame, the main body frame is divided into three layers, the floating body is arranged on the first layer of the main body frame, the physical and chemical parameter sensor interface, the camera system, the ocean current recording system and the lighting system are all installed on the first layer of the main body frame, the control system is installed on the second layer of the main body frame, the optical communication system is installed on the top of the second layer of the main body frame, the multi-channel Raman detection system and the power supply system are installed on the third layer of the main body frame, and the expansion frame is arranged on the side surface of the third layer of the main body frame for installing a Raman probe.

11. The monitoring method according to claim 8, wherein a coupling hook for connecting with the scientific research ship is arranged at the middle position of the top of the fixed component.

12. The monitoring method according to claim 11, wherein the coupling hook is connected with one end of an external releaser, the other end of the external releaser is connected with one end of an optical cable load-bearing head through a photoelectric conversion mechanism, and the other end of the optical cable load-bearing head is connected with a photoelectric composite optical cable or a coaxial cable of the scientific research ship.

13. The monitoring method according to claim 8, wherein the manual releaser comprises a pull pin, a spring and a connecting plate, a release plate is arranged at the end, close to the manual releaser, of the connecting rod, a through hole for the pull pin to pass through is formed in the connecting plate, the release plate and the connecting plate are fixed by the pull pin, and the spring sleeves the pull pin.

14. The monitoring method according to claim 8, wherein the side surface of the bottom counterbalance weight is provided with a lifting ring pin shaft.

15. The monitoring method according to claim 10, wherein the ocean current recording system comprises an ocean current meter and an ADCP, the ocean current meter is located on the side edge of the first layer of the main body frame, the ADCP is installed on the side surface of the first layer of the main body frame through a mounting frame, and the optical communication system comprises a lander carried light flux end and a hand-held light flux end, and the lander carried light flux end is located on the top of the second layer of the main body frame.

16. The monitoring method according to claim 10, wherein the control system has an on-line mode and an off-line mode, when the control system is connected with the coaxial cable or photoelectric composite optical cable of the scientific research ship, the control system is in the on-line mode, at this time, the operating time and interval of each unit of the monitoring device can be set, and when the control system is disconnected from the coaxial cable or photoelectric composite optical cable of the scientific research ship, the control system is in the off-line mode, at this time, the monitoring device starts to operate off-line according to the operating parameters set in the on-line mode; and in the off-line mode, the control system can access the monitoring device within the operating window period set in the on-line mode and has the same setting function as the on-line mode, after the control system ends the access, the monitoring device enters the off-line mode.

17. The monitoring method according to claim 11, wherein the control system has an on-line mode and an off-line mode, when the control system is connected with the coaxial cable or photoelectric composite optical cable of the scientific research ship, the control system is in the on-line mode, at this time, the operating time and interval of each unit of the monitoring device can be set, and when the control system is disconnected from the coaxial cable or photoelectric composite optical cable of the scientific research ship, the control system is in the off-line mode, at this time, the monitoring device starts to operate off-line according to the operating parameters set in the on-line mode; and in the off-line mode, the control system can access the monitoring device within the operating window period set in the on-line mode and has the same setting function as the on-line mode, after the control system ends the access, the monitoring device enters the off-line mode.

18. The monitoring method according to claim 12, wherein the control system has an on-line mode and an off-line mode, when the control system is connected with the coaxial cable or photoelectric composite optical cable of the scientific research ship, the control system is in the on-line mode, at this time, the operating time and interval of each unit of the monitoring device can be set, and when the control system is disconnected from the coaxial cable or photoelectric composite optical cable of the scientific research ship, the control system is in the off-line mode, at this time, the monitoring device starts to operate off-line according to the operating parameters set in the on-line mode; and in the off-line mode, the control system can access the monitoring device within the operating window period set in the on-line mode and has the same setting function as the on-line mode, after the control system ends the access, the monitoring device enters the off-line mode.

19. The monitoring method according to claim 13, wherein the control system has an on-line mode and an off-line mode, when the control system is connected with the coaxial cable or photoelectric composite optical cable of the scientific research ship, the control system is in the on-line mode, at this time, the operating time and interval of each unit of the monitoring device can be set, and when the control system is disconnected from the coaxial cable or photoelectric composite optical cable of the scientific research ship, the control system is in the off-line mode, at this time, the monitoring device starts to operate off-line according to the operating parameters set in the on-line mode; and in the off-line mode, the control system can access the monitoring device within the operating window period set in the on-line mode and has the same setting function as the on-line mode, after the control system ends the access, the monitoring device enters the off-line mode.

20. The monitoring method according to claim 14, wherein the control system has an on-line mode and an off-line mode, when the control system is connected with the coaxial cable or photoelectric composite optical cable of the scientific research ship, the control system is in the on-line mode, at this time, the operating time and interval of each unit of the monitoring device can be set, and when the control system is disconnected from the coaxial cable or photoelectric composite optical cable of the scientific research ship, the control system is in the off-line mode, at this time, the monitoring device starts to operate off-line according to the operating parameters set in the on-line mode; and in the off-line mode, the control system can access the monitoring device within the operating window period set in the on-line mode and has the same setting function as the on-line mode, after the control system ends the access, the monitoring device enters the off-line mode.

* * * * *